United States Patent
Hayashi et al.

(10) Patent No.: US 8,156,076 B2
(45) Date of Patent: Apr. 10, 2012

(54) TERMINAL AND DATA DISTRIBUTION SYSTEM

(75) Inventors: Hideki Hayashi, Hachioji (JP); Daisuke Ito, Kokubnji (JP); Akinori Asahara, Kokubunji (JP); Shigeru Shimada, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 886 days.

(21) Appl. No.: 12/003,193

(22) Filed: Dec. 20, 2007

(65) Prior Publication Data

US 2009/0019057 A1    Jan. 15, 2009

(30) Foreign Application Priority Data

Jul. 11, 2007    (JP) ................. 2007-182039

(51) Int. Cl.
*G06F 17/20* (2006.01)
*G06F 15/16* (2006.01)
(52) U.S. Cl. ......... 707/618; 707/628; 717/172; 701/208
(58) Field of Classification Search .................. 707/618, 707/624; 717/171, 172; 701/208
See application file for complete search history.

(56) References Cited

U.S. PATENT DOCUMENTS

| 6,073,141 | A * | 6/2000 | Salazar ............................... 1/1 |
| 6,100,887 | A * | 8/2000 | Bormann et al. ............. 715/764 |
| 7,590,486 | B2 | 9/2009 | Okude et al. |
| 2006/0106806 | A1 * | 5/2006 | Sperling et al. ................ 707/10 |
| 2007/0192763 | A1 * | 8/2007 | Helvick ........................ 717/168 |
| 2007/0261050 | A1 * | 11/2007 | Nakano et al. ................ 717/172 |

FOREIGN PATENT DOCUMENTS

| JP | 2004-249914 | 9/2004 |
| JP | 2006-293696 | 4/2005 |
| JP | 2005-214779 | 8/2005 |
| JP | 2006-047112 | 2/2006 |

OTHER PUBLICATIONS

Office Action issued by the Japanese Patent Office on Oct. 4, 2011 in the corresponding Japanese Patent Application No. 2007-182039 (3 pages), including an English language translation (4 pages).

* cited by examiner

*Primary Examiner* — John E Breene
*Assistant Examiner* — Alex Gofman
(74) *Attorney, Agent, or Firm* — Stites & Harbison, PLLC; Juan Carlos A. Marquez, Esq.

(57) ABSTRACT

Disclosed herewith is a terminal for receiving data distributed from a host computer. The terminal includes a database for storing data distributed from the host computer and a schedule manager for managing the schedule of the terminal. Upon receiving an update request for the data stored in the database, the terminal extracts a time band in which the usage frequency of the terminal is kept low as an updatable time through the schedule manager and sends an update request to the host computer in response to the received request. The terminal calculates a processing time required to update object data, as well as a value denoting the usefulness of the object data according to the update information received from the host computer and including the object data, then decides a processing order for the object data according to the processing time and the usefulness value calculated respectively for the object data, thereby updating the data stored in the database according to the decided processing order. Useful data is updated preferentially in the time band in which the usage frequency of the terminal is low.

10 Claims, 19 Drawing Sheets

FIG. 10

| NO | TID | OPERATION | OLD VALUES ||||| NEW VALUES |||||
|---|---|---|---|---|---|---|---|---|---|---|---|---|
| | | | POI ID | CATEGORY | NAME | LOCATION | ... | POI ID | CATEGORY | NAME | LOCATION | ... |
| 1 | 1 | DELETE | 3 | BANK | CCC BANK | (x3, y3) | ... | N | N | N | N | ... |
| 2 | 2 | UPDATE | 4 | CONVENIENCE STORE | DDD SHOP | (x4, y4) | ... | 4 | CONVENIENCE STORE | EEE SHOP | (x4, y4) | ... |
| 3 | 3 | INSERT | N | N | N | N | ... | 5 | RESTAURANT | FFF RESTAURANT | (x5, y5) | ... |
| 4 | 4 | INSERT | N | N | N | N | ... | 6 | SUPERMARKET | GGG MART | (x6, y6) | ... |
| 5 | 4 | INSERT | N | N | N | N | ... | 7 | PARKING | HHH PARKING | (x7, y7) | ... |
| .. | .. | ... | .. | ... | ... | ... | ... | .. | ... | ... | ... | ... |

CALCULATING TIME FOR EXECUTING TRANSACTION (S204) AND USEFULNESS VALUE FOR TRANSACTION (S205)

↓

TRANSACTION PROPERTY TABLE

| TID | EXECUTION TIME | GAIN VALUE |
|---|---|---|
| 1 | T1 | V1 |
| 2 | T2 | V2 |
| 3 | T3 | V3 |
| 4 | T4 | V4 |

REGION IN WHICH MOBILE HOST GETS UPDATE LOGS FOR POIS

EXTENDING REQUEST CONDITION: UPDATE LOGS FOR POIS WHICH ARE GREATER OR EQUAL THAN r AWAY FROM DESTINATION AMONG THOSE WITHIN THE CIRCLE WITH CENTER AT DESTINATION AND GIVEN RADIUS r'

EXTENDING REQUEST CONDITION:
UPDATE LOGS FOR POIS WHICH ARE GREATER
OR EQUAL THAN d AS SHORTEST DISTANCE
AWAY FROM ROUTE R AMONG POIS WITHIN
REGION WITH CENTER AT ROUTE R AND WIDTH d'

TERMINAL AND DATA DISTRIBUTION SYSTEM

CLAIM OF PRIORITY

The present application claims priority from Japanese application JP 2007-182039 filed on Jul. 11, 2007, the content of which is hereby incorporated by reference into this application.

FIELD OF THE INVENTION

The present invention relates to a technique for updating terminal data in a system including a host computer and a terminal.

BACKGROUND OF THE INVENTION

In recent years, such terminals as car navigation devices, portable phones, PDAs (Portable Digital Assistants), etc. have been enhanced rapidly, so that mass of data have also been handled in those devices. Under such circumstances, mobile hosts have come to be provided with a database management system respectively to cope with management of such mass of data efficiently. The database of each of such mobile hosts stores part or whole of data items of a database held by its fixed service host (hereinafter, to be referred to as a "service host"). For example, in a map distribution system for in-vehicle devices, the in-vehicle devices store the data items of a map database managed by the map center (service host).

However, if some data items in the database held by the service host are updated, the updated data items lose the consistency with the data items in the database held by the mobile host, thereby the user might access invalid data items. In such a case, the mobile host communicates with the service host to acquire updated data items and update the data items in its own database.

Updating the database held by the mobile host requires much time if there are many data items to be updated, since the wireless communication between the mobile host and the service host is low-speed and furthermore, the mobile host hardware performance is low. One of the effective methods for avoiding such a problem is incremental update method, which updates only the data items required by the user. In the case of this incremental update method, the mobile host updates only part of data items in its own database. For example, JP-A No. 2006-293696 discloses a technique of an in-vehicle data update system. According to the technique, the in-vehicle device acquires only the latest POI (Point of Interest)s included in a user's desired region from the map center. At this time, the map center sets the maximum number of POIs to be sent to the in-vehicle device. The communication load is prevented from increasing when updating is made for a region in which the number of POIs has increased abruptly because the number of data to be updated is limited.

SUMMARY OF THE INVENTION

However, the database update of the mobile host as described above has been confronted with a problem; it takes a long time for the processing from when the mobile host requests the service host to update the database according to an update request from the user to when the database update is completed (hereinafter, to be referred to as a "database update completion time"). Most of the database update completion time is occupied by a time for sending updated data items from the service host to the mobile host through wireless communications and a time for updating the mobile host database according to the received updated data items.

In the case of the technique disclosed by JP-A No. 2006-293696, the map center limits the number of data items to be updated in its own database and sends POIs to the mobile host, thereby the database update completion time is suppressed from increasing. On the other hand, there are also some cases in which the mobile host permits a longer database update time to a certain degree to increase the number of data items to be updated in its own database. In other words, the user might want a case in which the user is allowed to set a necessary update time for the database and request as many data items to be updated as possible within a set time. The technique disclosed by JP-A No. 2006-293696 cannot satisfy such a user's request.

In the case of the technique disclosed in JP-A No. 2006-293696, it is not supposed that the mobile host updates its own database through transaction processings as a processing unit. A transaction processing executes a plurality of related processings. For example, the user might want to insert data items related to a shop and a parking lot of the shop simultaneously upon updating the POI database in the in-vehicle device.

Furthermore, the technique has also been confronted with another problem; while the mobile host updates database, the user cannot execute another processing smoothly on the mobile host. This is because most of calculation resources in the mobile host are assigned to the database update processings. If the database update completion time is long, this problem becomes particularly serious. The mobile host database should thus be updated while the mobile host is idle.

On the other hand, a database update might be canceled while the database update is continued for a long time, since the user is driven to operate the mobile host during the update processing. In this case, the user comes to access the database that is being updated. To avoid such a trouble, therefore, the mobile host, expecting such an abrupt cancellation, is required to execute a transaction that includes update operations beneficial for the user preferentially.

A typical embodiment of the present invention is a terminal for receiving data distributed from a host computer. The terminal includes a database for storing the data items distributed from the host computer and a schedule manager for managing the schedule of the terminal. The schedule manager, upon receiving an update request for the data items stored in the database, detects a timing at which the usage frequency of the terminal becomes low and extracts a data updatable time at which the usage frequency of the terminal is low continuously, from the detected timing. The schedule manager then sends an update request to the host computer in response to the received update request; calculates necessary processing times and values denoting the usefulness for the object data items respectively according to the update information including the object data items received from the host computer as a response to the update request; and decides a processing order for the object data items according to the processing times and the usefulness value calculated respectively for the object data items; and updates the data items in the database according to the decided processing order.

According to the embodiment of the present invention, the user can update useful data items preferentially in a time band in which the usage frequency of the terminal becomes low.

BRIEF DESCRIPTION OF THE DRAWINGS

FIG. 10 is a transaction property table generated according to an update log in the embodiment of the present invention;

DETAILED DESCRIPTION OF THE PREFERRED EMBODIMENTS

Hereunder, there will be described the preferred embodiment of the present invention with reference to the accompanying drawings. It is premised in this embodiment that a service host corresponds to a map center and a mobile host corresponds to an in-vehicle device to describe an example for updating a POI table provided in a navigation system installed in the in-vehicle device.

Figure 1:
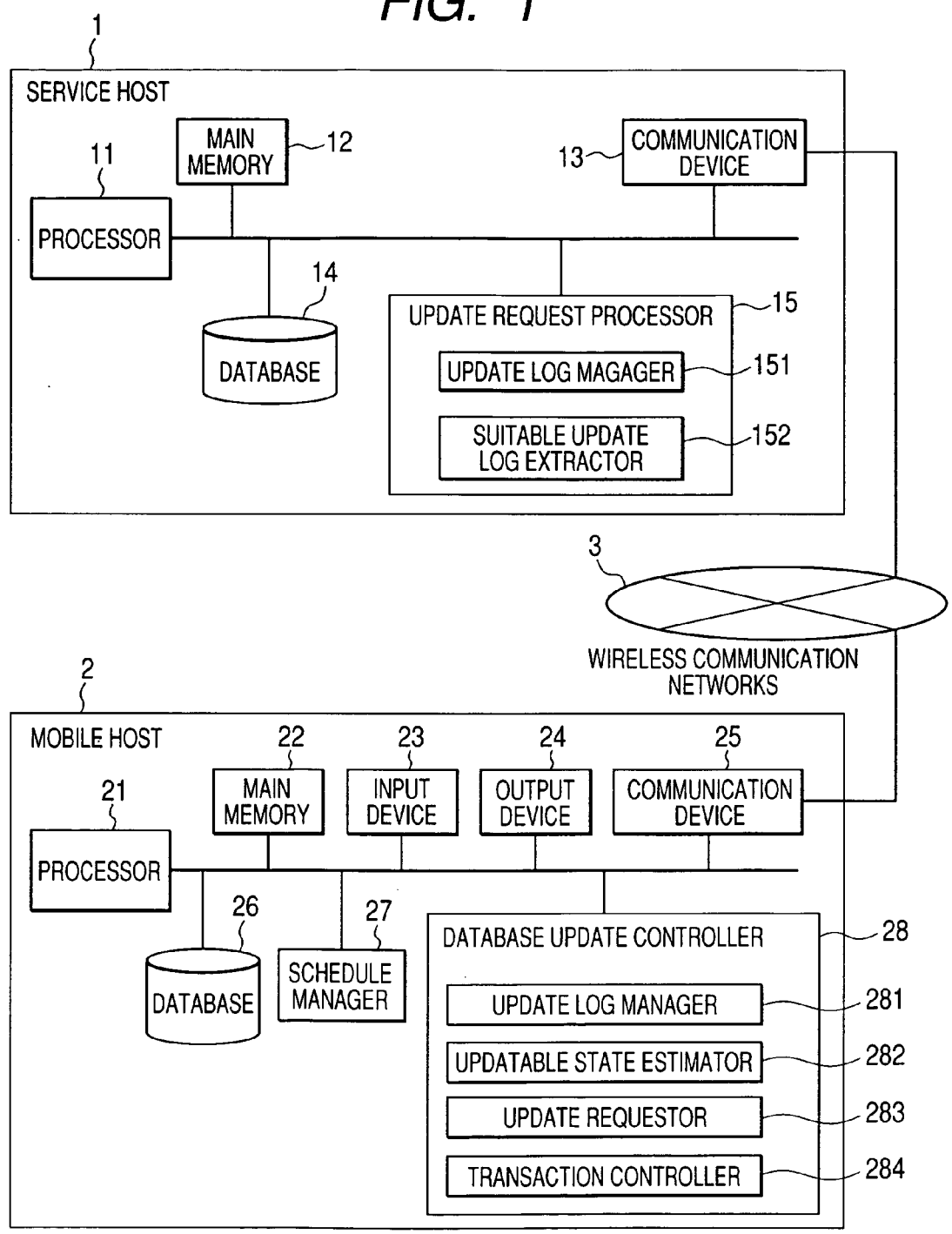
FIG. 1 is a configuration of a mobile host database distribution system in an embodiment of the present invention.

FIG. 1 shows a configuration of a mobile host database distribution system in an embodiment of the present invention.

The mobile host database distribution system includes a service host 1 and a mobile host 2. The service host 1 and the mobile host 2 are connected to each other through a wireless communication network 3. The wireless communication network 3 is a portable phone network or wireless LAN (Local Area Network), for example.

The service host 1 manages map data to be distributed to the mobile host 2. The service host 1 also sends update information of the map data to the mobile host 2 in response to a request received therefrom.

The mobile host 2 stores the map data. The mobile host 2 includes navigation functions for using the stored map data. In this embodiment, the mobile host 2 presents road information, shop information, etc. to the user in response to each user's request.

The service host 1 includes a processor 11, a main memory 12, a communication device 13, a database 14, and an update request processor 15.

The processor 11 executes programs stored in the main memory 12 to execute various types of processings. Concretely, the processor 11 executes all the processings executable in the service host 1, such as database update processings, update processings requested from the mobile host 2, extraction of an update log matching with each update request, sending the update log to the mobile host 2, etc.

The main memory 12 stores necessary data for the programs and processings to be executed by the processor 11. The communication device 13 sends/receives data to/from the mobile host 2 through the wireless communication network 3.

The database 14 manages map data accessed by the navigation functions of the mobile host 2. Concretely, the map data consists of background map data, route searching data, POI items, etc. This embodiment of the present invention will be describe update processes for the database held by the mobile host 2 with the POI items updated in the service-host 1. The POI table for storing POI data will be described later with reference to FIG. 2. The database 14 manages an update log table for recording update operations with respect to the POI table as an update log. The update log table will be described later with reference to FIG. 3.

The update request processor 15 includes an update log manager 151 and a suitable update log extractor 152. The update log manager 151 and the suitable update log extractor are programs to be executed by the processor 11.

The update log manager 151, under the control of the processor 11, writes an update log including updated, deleted, and added POI items in the update log table in order of the time series when POI items are updated.

The suitable update log extractor 152 extracts update logs requested from the mobile host 2 from the update log table upon accepting an update request from the mobile host 2 under the control of the processor 11. For example, when a mobile host requests updated POI items around a specified destination, the extractor 152 extracts the update logs of POI items included in a circle region near the destination.

The mobile host 2 includes a processor 21, a main memory 22, an input device 23, an output device 24, a communication device 25, a database 26, a schedule manager 27, and a database update controller 28.

The processor 21 processes programs stored in the main memory 22 to execute various types of processings. Concretely, the processor executes all the processings executable in the mobile host 2, such as database updatable time estimation, generating and sending update requests to the service host 1, receiving update logs from the service host 1, controlling transactions, etc.

The main memory 22 stores necessary data for the programs and processings executed by the processor 21. The communication device 25 sends/receives data to/from the service host 1 through the wireless communication network 3.

The input device 23 accepts destination inputs and update requests with respect to the database 26, with use of the navigation functions. The input device 23 may be, for example, a touch panel.

The output device 24 outputs necessary information for the navigation functions of the mobile host 2. The output device 24 may be, for example, a liquid crystal display. The output device 24 displays, for example, maps, routes, or required times to reach destinations. The output device 24 can also display an update state of the database 26.

The database 26 stores the same schema table as that of the database 14 held by the service host 1. The database 26 also stores necessary map data for the navigation functions. Furthermore, the database 26 stores an update log table corresponding to the database 14 just like the service host 1.

The schedule manager 27 stores a program for managing user's action schedules. The processor 21 executes the program 21. In this embodiment of the present invention, the navigation functions are equivalent to those of the schedule manager 27. The updatable state estimator 282 uses the schedule information of the schedule manager 27 to estimate a time band in which the user does not use the mobile host so much. In this embodiment of the present invention, the schedule manager 27 is used to estimate a time band in which the user makes driving on a freeway.

The database update controller 28 includes an update log manager 281, an updatable state estimator 282, an update requester 283, and a transaction controller 284. The update log manager 281, the updatable state estimator 282, the update requester 283, and the transaction controller 284 are programs executed by the processor 21.

The update log manager 281 includes functions equivalent to those of the update log manager 151 of the service host 1 and stores update operations with respect to the POI table of the database 26 under the control of the processor 21. The updatable state estimator 282 acquires a time band in which the usage frequency of the mobile host 2 becomes low according to the information stored in the schedule manager 27 under the control of the processor 21. In this embodiment of the present invention, the navigation functions of the mobile host 2 are used to set a time band in which the user makes driving on a freeway as an updatable time band.

The update requester 283 decides data to be requested to the service host 1 under the control of the processor 21 and sends the decided request to the service host 1. The transaction controller 284 estimates a transaction processing time required to execute a transaction for an update log received from the service host 1 under the control of the processor 21 and decides whether or not all the transactions can be executed easily within the updatable time. The transaction controller 284 also decides a transaction executing order in response to a user's request and executes object transactions in the decided order.

Figure 2:
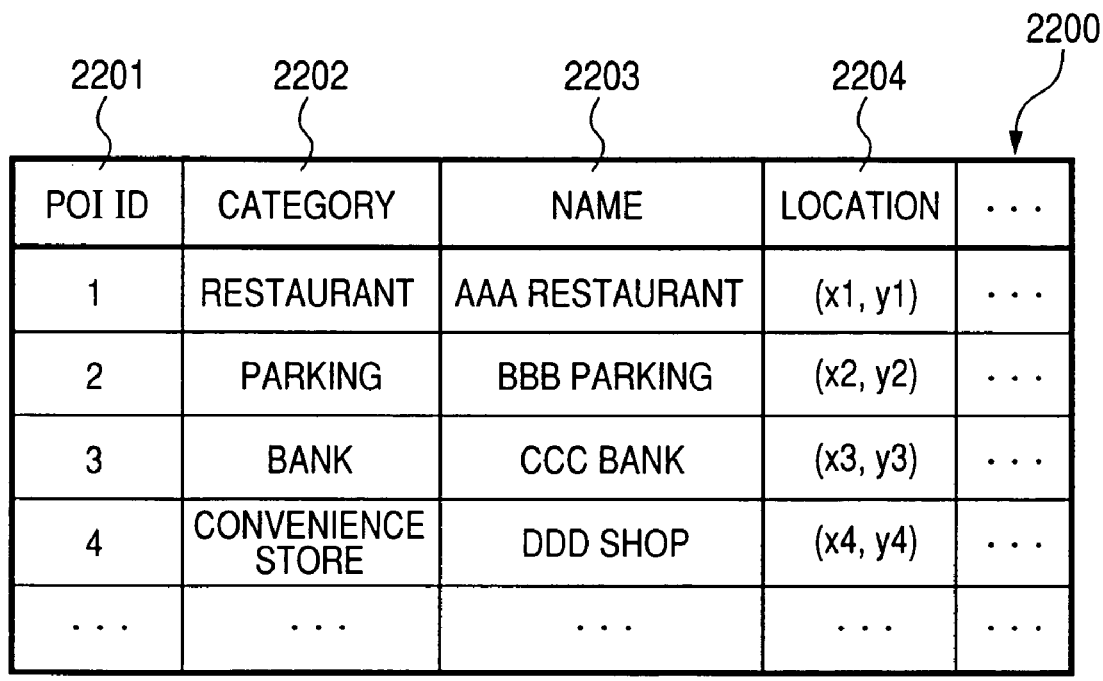
FIG. 2 is a configuration of a POI table in the embodiment of the present invention.

FIG. 2 shows a configuration of a POI table in this embodiment of the present invention.

The POI table is stored in the databases 14 and 26 held by the service host 1 and the mobile host 2 respectively. The POI table held by the service host 1 stores the latest POI data. The POI table held by the mobile host 2 is updated into the latest POI items automatically or in response to a user's request.

The POI table includes elements of POI ID 2201, category 2202, name 2203, and location 2204.

The POI ID 2201 is an identifier for identifying the POI item. The category 2202 denotes a type of a facility to which POI belongs. For example, the facility is a restaurant, parking lot, bank, convenience store, or the like. The name 2203 denotes a POI name. The location 2204 denotes a coordinate value of a site-assumed as the POI center position on a map. For example, it is represented by a combination of the latitude and the longitude.

The POI table shown in FIG. 2 includes four attributes. The POI table may also include other attributes such as region, address, phone number, etc.

Figure 3:
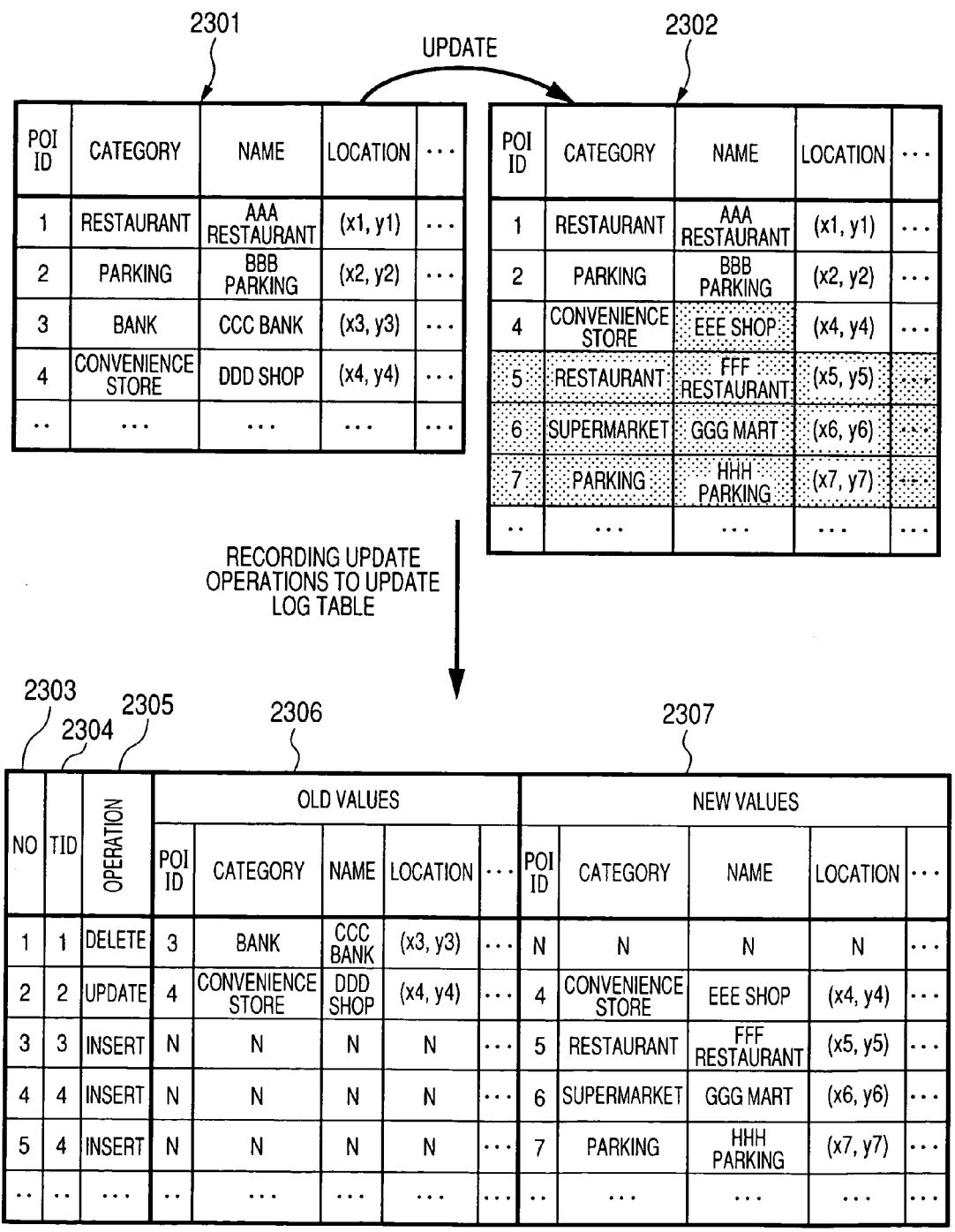
FIG. 3 is a configuration of an update log table in the embodiment of the present invention.

FIG. 3 shows a configuration of an update log table in this embodiment of the present invention.

The update log table includes elements of NO 2303, TID 2304, operation 2305, old value 2306, and new value 2307.

The update log table is generated when the POI table 2301 is updated and the updated POI table 2302 is acquired by the service host 1. Each half-tone portion in the POI table 2302 is an updated portion. Hereunder, how to update the POI table 2301 will be described concretely. At first, a record of which POI_ID is "3" is deleted from the POI table 2301. Then, the name of a record of which POI_ID is "4" is updated. And finally, records of which POI_IDs are "5", "6", and "7" are added to the table respectively.

The NO 2303 is an update log number and identifier for identifying an update log uniquely. TID 2304 is a transaction ID and identifier for identifying a transaction for managing a series of update processings uniquely.

The operation 2305 denotes a database modification operation, which is classified into "INSERT", "DELETE", and "UPDATE".

The old value 2306 denotes a value included in the 2301 before updating. The new value 2307 denotes a value included in the POI table 2302 after updating. The old value 2306 and the new value 2306 have the same attributes as those of the POI table. When the update operation is "INSERT", the new value 2307 records data and the old value 2306 records a NULL. The "N" described in the update log shown in FIG. 3 denotes "NULL". When the update operation is "DELETE", only the old value data is recorded and the new value denotes "NULL". When the update operation is "UPDATE", both old and new value data are recorded.

In the update operation shown in FIG. 3, the record of which NO 2302 value is "1" in the update log table stores an update operation for the record of which POI ID 2201 is "3" in the POI table 2200.

The records of which NO 2303 values are "4" and "5" in the update log table take the same value of TID 2304. This means that the same transaction processing is executed to update those data items. Consequently, it is understood that the "GGG supermarket" of which POI_ID is "6" and the "HHH parking lot" of which POI_ID is "7" depend on each other. For example, the "HHH parking lot" belongs to the "GGG supermarket". Such way, if a plurality of update operations are executed by one transaction, the same value is set in each TID 2304 in the update log table.

Figure 4:
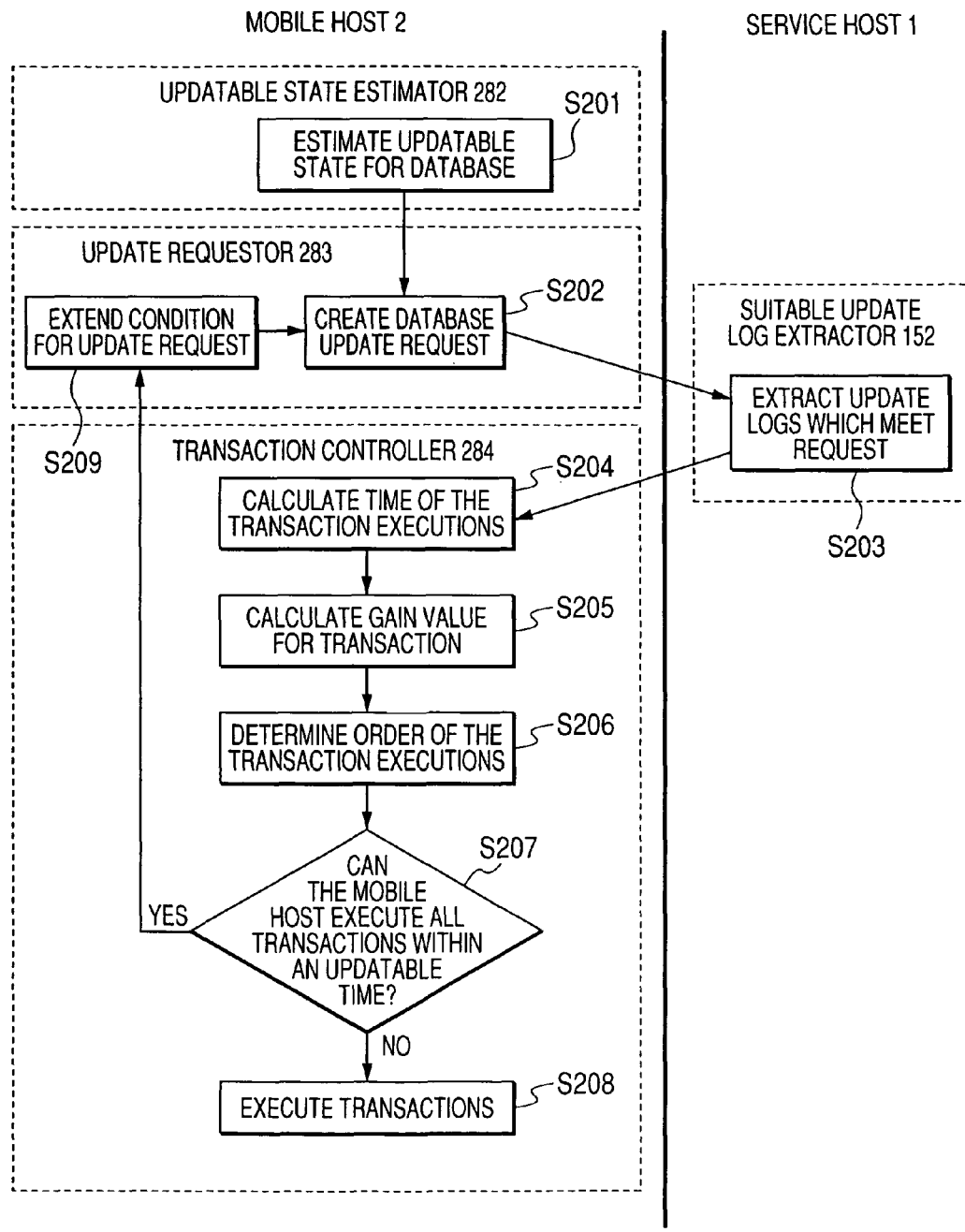
FIG. 4 is a flowchart of a procedure for updating the mobile host database in the embodiment of the present invention.

FIG. 4 is a flowchart of a procedure for updating the database 26 of the mobile host 2 in this embodiment of the present invention. This update processing is executed upon receiving an update command through the input device 23 of the mobile host 2.

The processor 21 of the mobile host 2, upon detecting its entry to a freeway by executing the updatable state estimator 282, acquires an updatable time that is a freeway driving time and sets the destination at the update point (S201).

The processor 21 of the mobile host 2 receives an updatable time and a destination as input information from the processing of the updatable state estimator 282 upon executing the update requester 283. The processor 21 decides data items to be requested to the service host 1 according to the user's destination, then sends the data to the service host 1 (S202).

The processor 21 of the service host 1, upon receiving an update request from the mobile host 2, executes the suitable update log extractor 152 to extract an object update log and sends the extracted update log to the mobile host 2 (S203).

The processor 21 of the mobile host 2 executes the transaction controller 284 to calculate an execution time of the transaction included in the received update log according to the update log received from the service host 1 (S204). The processor 21 calculates the usefulness to the user as a transaction gain assumed upon executing the transaction (S205). The processor 21 decides a transaction execution order in a descending order of the transaction gain values (S206).

The processor 21 of the mobile host 2 then confirms whether or not it is possible to execute all the subject transactions easily within the updatable time acquired from the processing in step S201 (S207). If it is possible (YES selected in S207), the processor 21 executes the update requester 283 to extend the update request condition according to the residual updatable time, thereby acquiring more update logs from the service host 1 (S209). The processor 21 then executes the processing in step and after step S202. On the other hand, if it is impossible (NO selected in S207), the processor 21 executes object transactions according to the execution order of the decided transaction (S208).

Figure 5:
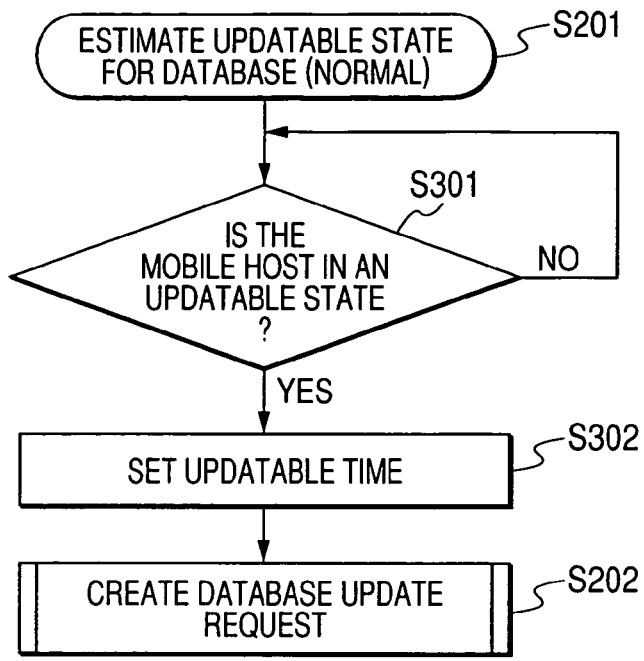
FIG. 5 is a flowchart of a procedure for estimating a database updatable state in the embodiment of the present invention.

FIG. 5 is a flowchart of a procedure for estimating a database update state in this embodiment of the present invention. This flowchart shows details of the processing in step S201 shown in FIG. 2.

The processor 21 of the mobile host 2 executes the updatable state estimator 282 to decide whether or not it is possible to update the database 26 (S301). Concretely, the processor 21 acquires the user's action schedule from the schedule manager 27 to decide whether or not the user does not use the mobile host so much in the subject time band.

The processor 21 of the mobile host 2, if not possible to update the database 26 (NO selected in S301), keeps monitoring of the state of the database 26.

The processor 21 of the mobile host 2, if possible to update the database 26 (YES selected in (S301), estimates a continuous time band in which the database 26 can be updated and sets the estimated time band as an updatable time (S302). The processor 21 then stores the updatable time and the destination in the main memory 22 and generates a database update request (S202).

Figure 6:
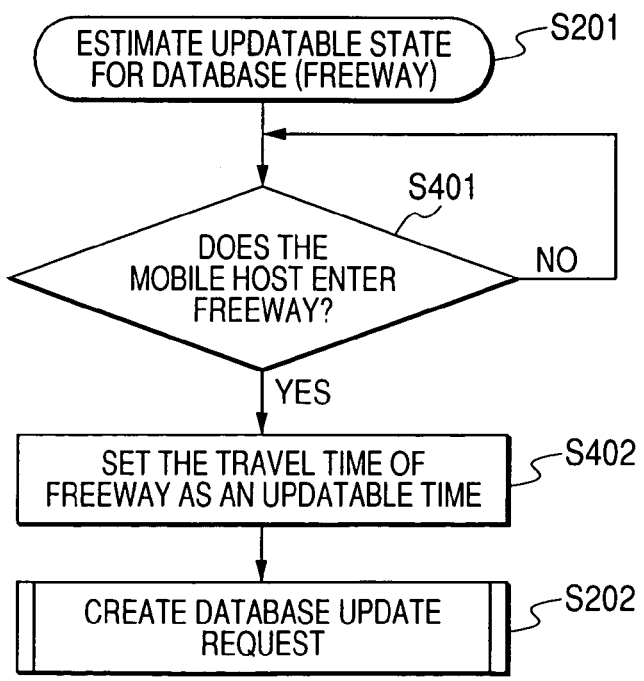
FIG. 6 is a flowchart of a procedure for estimating a database updatable state on a speedway in the embodiment of the present invention.

FIG. 6 is a flowchart of a procedure for estimating a database update state on a freeway in this embodiment of the present invention. In this processing, it is premised that the processing shown in FIG. 5 has decided a time band in which the usage frequency of the user's mobile host 2 is low.

At first, the processor 21 of the mobile host 2 decides whether or not the mobile host installed vehicle has entered a freeway (S401). This decision may be made by correlating the current position with the map database or the vehicle may receive an ETC (Electronic Till Collection) signal upon entering the object freeway.

The processor 21 of the mobile host 2, when the subject vehicle enters a freeway (YES in S401), calculates a time required until the vehicle goes out of the freeway into a general road with the navigation functions of the mobile host 2 and sets the vehicle's running time on the freeway as an database updatable time (S402). The processor 21 then stores the database updatable time and the destination in the main memory 22 and generates a database update request (S202).

The updatable state of the database 26 may be any of the states in which the mobile host installed vehicle is running on a suburban road; running on a road in congestion; stops at a crossing; etc. if the user is expected less to use the mobile host in the state.

Figure 7:
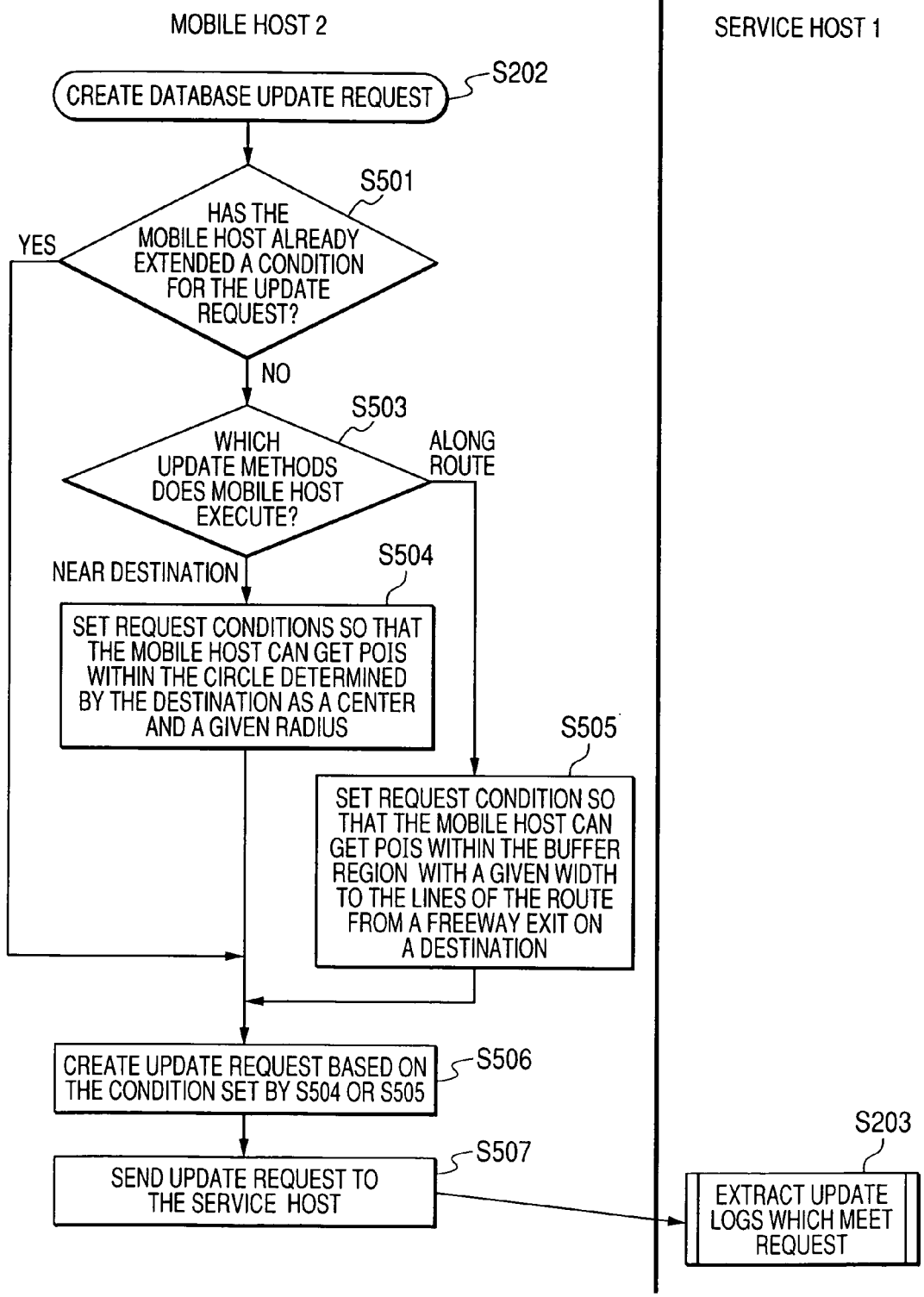
FIG. 7 is a flowchart of a detailed procedure for a mobile host to generate a database update request in the embodiment of the present invention.

FIG. 7 is a flowchart of a procedure for generating a database update request to be sent to the mobile host 2 in this embodiment of the present invention.

At first, the processor 21 of the mobile host 2 decides whether or not an update request condition extension processing (S209) is executed before executing this processing (S501). If it is executed (YES selected in S501), it means that conditions of an update method for POI items, etc. are already set. The processor 21 thus generates an update request (S506).

On the other hand, if it is not executed yet (NO selected in S501), the processor 21 accepts a user-specified update method to be applied to the POI table (S503). The user thus sets either of updating "near destination" or updating "along route" through the input device of the mobile host 2.

The processor 21 of the mobile host 2, when selecting updating "near destination" (selected in S503), sets the conditions to acquire updated POI items within a circle region determined by the destination as a center and a predetermined radius around (S504).

On the other hand, when selecting updating "along route" (selected in S503), the processor 21 sets the conditions to acquire updated POI items included in a predetermined distance around the route from an entry point to a general road to the destination (S505).

The processor 21 of the mobile host 2 then generates an update request according to the set conditions (S506). The update request includes the destination and the radius of the circular region when updating "near destination" is selected in response to the update request. If updating "along route" is selected in response to the update request, the update request includes a route and a route width. The processor 21 of the mobile host 2 then sends the generated update request to the service host 1 (S507).

Figure 8:
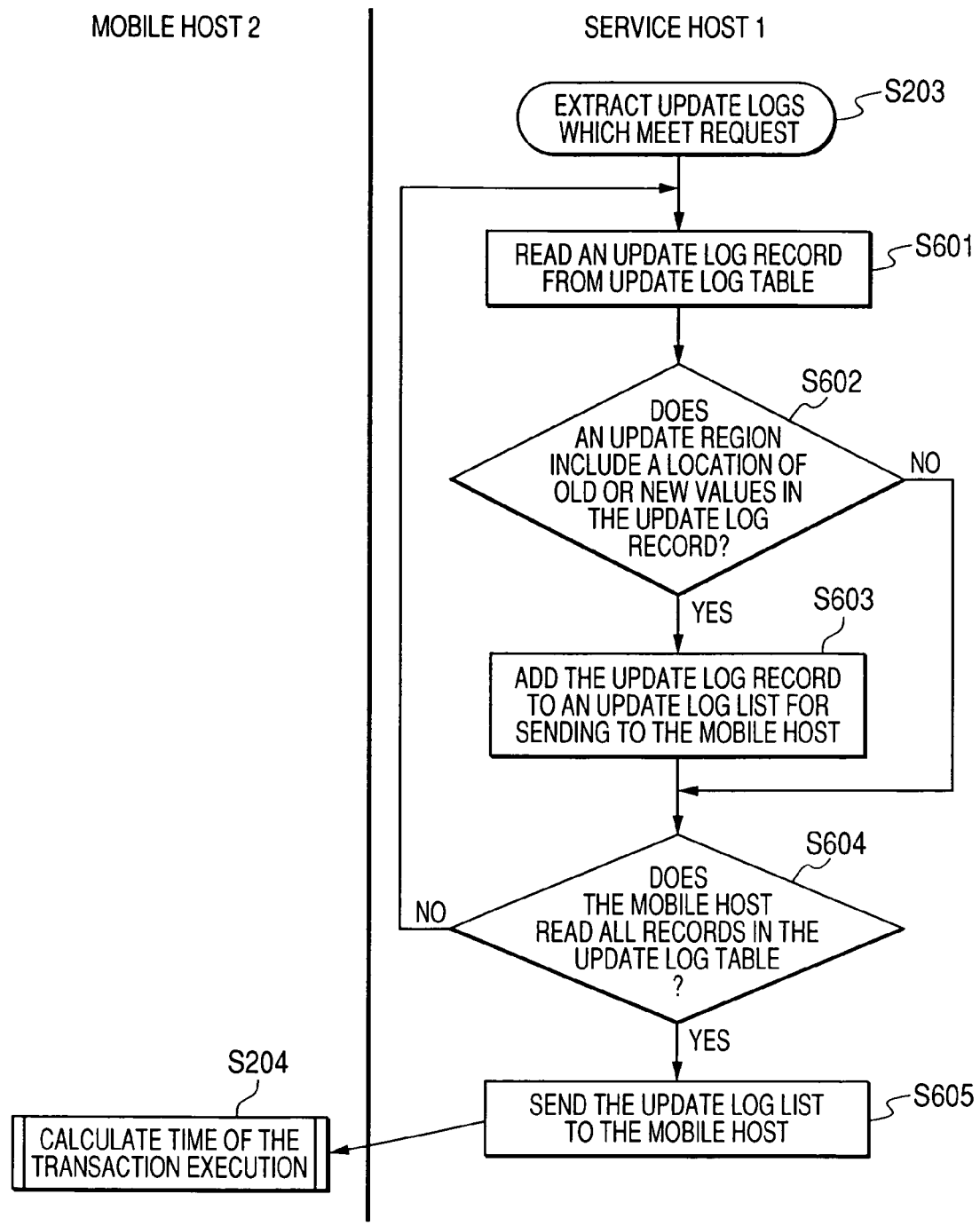
FIG. 8 is a flowchart of a procedure for a service host to extract an update log suitable to the update request received from the mobile host in the embodiment of the present invention.

FIG. 8 is a flowchart of a procedure for extracting an update log suitable for the update request received from the mobile host in this embodiment of the present invention.

At first, the processor 11 of the service host 1 reads one record from the update log table stored in the database 14 (S601). In the initial state, the processor 11 reads the first record from the update log table.

The processor 11 of the service host 1 decides whether or not the position of the old value 2306 or the new value 2307 of the read update log record is included in the update-requested region (S602). If the position is included in the update-requested region (YES selected in S602), it means that the read update log is requested from the mobile host 2. The processor 11 thus inserts the update log record in the update log list (S603). The update log list stores an update log to be sent to the mobile host 2 from the service host 1.

After executing the processing in step S603, if the position of the old value 2306 or new value 2307 in the update log record is not included in the update requested region (NO selected in S602), the processor 11 of the service host 1 decides whether or not the record being read from the update log table has reached its end (S604).

If the end is not reached yet (NO selected in S604), the processor 11 reads the next update log record and continues the update-log extraction (S601). If the end is reached (YES selected in S604), the processor 11 sends the update log included in the update log list to the mobile host 2 (S605).

In this embodiment of the present invention, update logs included in the requested region are searched sequentially from the first record in the update log table. If the number of records in the update log table increases, however, the searching time becomes long significantly. To avoid this and search those update logs included in the requested region more efficiently, a method for generating spatial indexes according to their positions included in the update logs will be effective.

It is also possible to include the version information of each object data stored in the mobile host 2, etc. in each update request sent from the mobile host 2, thereby preventing sending of unnecessary (already applied) update logs to the mobile host 2.

Figure 9:
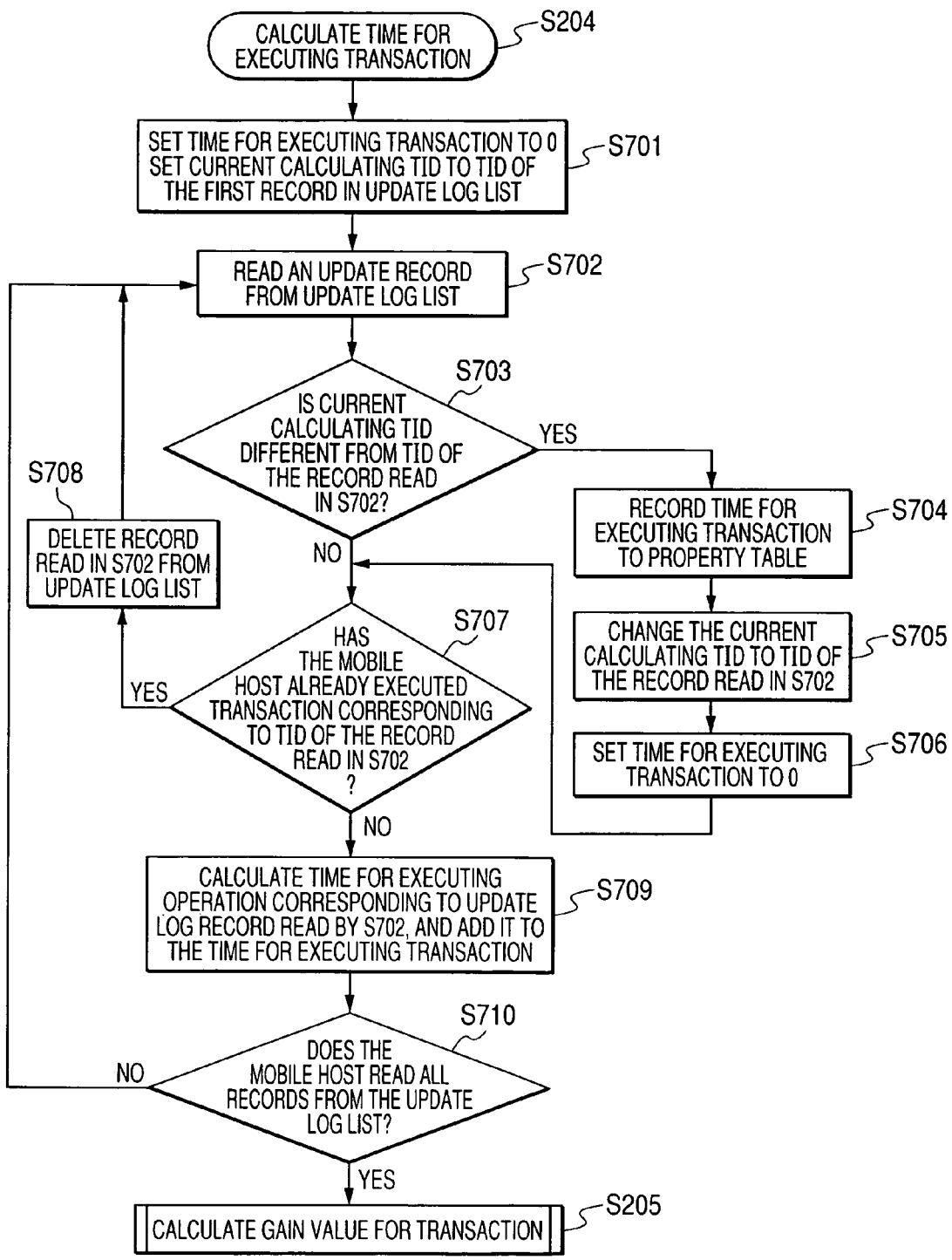
FIG. 9 is a flowchart of a procedure for calculating a transaction processing time on the mobile host in the embodiment of the present invention.

FIG. 9 is a flowchart of a procedure for calculating a time of a transaction processing executed in the mobile host 2 in this embodiment of the present invention.

At first, the mobile host 2 refers to the update log list received from the service host 1 and assumes update log records (hereinafter, to be referred to simply as the records) having the same transaction ID as one record. The mobile host 2 then estimates an execution time of each of the update logs included in the same transaction and assumes the sum of the update log execution times as a transaction processing time.

At first, the processor 21 of the mobile host 2 sets 0 for the transaction processing time. The processor 21 of the mobile host 2 then sets the ID of a calculation object transaction as the transaction ID of the first record in the update log list received from the service host 1 (S701).

The processor 21 of the mobile host 2 reads one record from the update log list received from the service host 1 (S702) and decides whether or not there is a difference between the ID of the current calculation object transaction and the transaction ID of the read record (S703).

If there is a difference between those IDs (YES selected in S703), the processor 21 records the calculated transaction processing time in a transaction property table. The transaction property table will be described later with reference to FIG. 10.

The processor 21 changes the current transaction ID to the transaction ID of the record read in the processing in step S702 (S705) and sets 0 for the transaction processing time (S706).

The processor 21 of the mobile host 2, if there is no difference between those IDs (NO selected in S703) or if the processing in S706 is terminated, decides whether or not the read record transaction is already executed in the processing in S702 (S707). If the subject transaction ID is included in the update log table in which transactions executed by the mobile host 2 are recorded, it means that the mobile host already has executed the subject transaction.

If the read transaction is already executed (YES selected in S707), the processor 21 of the mobile host 2 deletes the record from the update log list (S708) and executes the processing in S702. If the read transaction is not executed yet (NO selected in S707), the processor 21 calculates an execution time according to the database operation included in the record and adds the result to the value of the transaction processing time (S709).

The processor 21 then decides whether or not all the object records are read from the update log list (S710). If not read yet (NO selected in S710), the processor 21 executes the processing in S702. If all the records are read (YES selected in S710), the processor 21 goes to the processing for calculating a gain value of the transaction (S205).

Upon completing the above processings, the execution time of the transaction included in the update log is recorded in the transaction property table.

FIG. 10 is a diagram for describing a transaction property table generated according to update logs in this embodiment of the present invention.

The transaction property table includes items of TID 2401, execution time 2402, and gain value 2403.

The TID 2401 denotes an identifier for identifying a transaction ID.

The execution time 2402 denotes a processing time required for executing an object transaction. The value of this execution time 2402 can be calculated, for example, according to the number of operations included in each of the operations INSERT, DELETE, and UPDATE by measuring the processing times of those INSERT, DELETE, and UPDATE operations for records in the database held by the mobile host 2.

The gain value 2403 denotes a level of the usefulness of the information to be updated for the user when an object transaction identified with the TID 2401 is executed. In this embodiment, a value representing the usefulness is defined as a gain value. How to calculate such a gain value concretely will be described later with reference to FIGS. 11 and 12.

Figure 11:
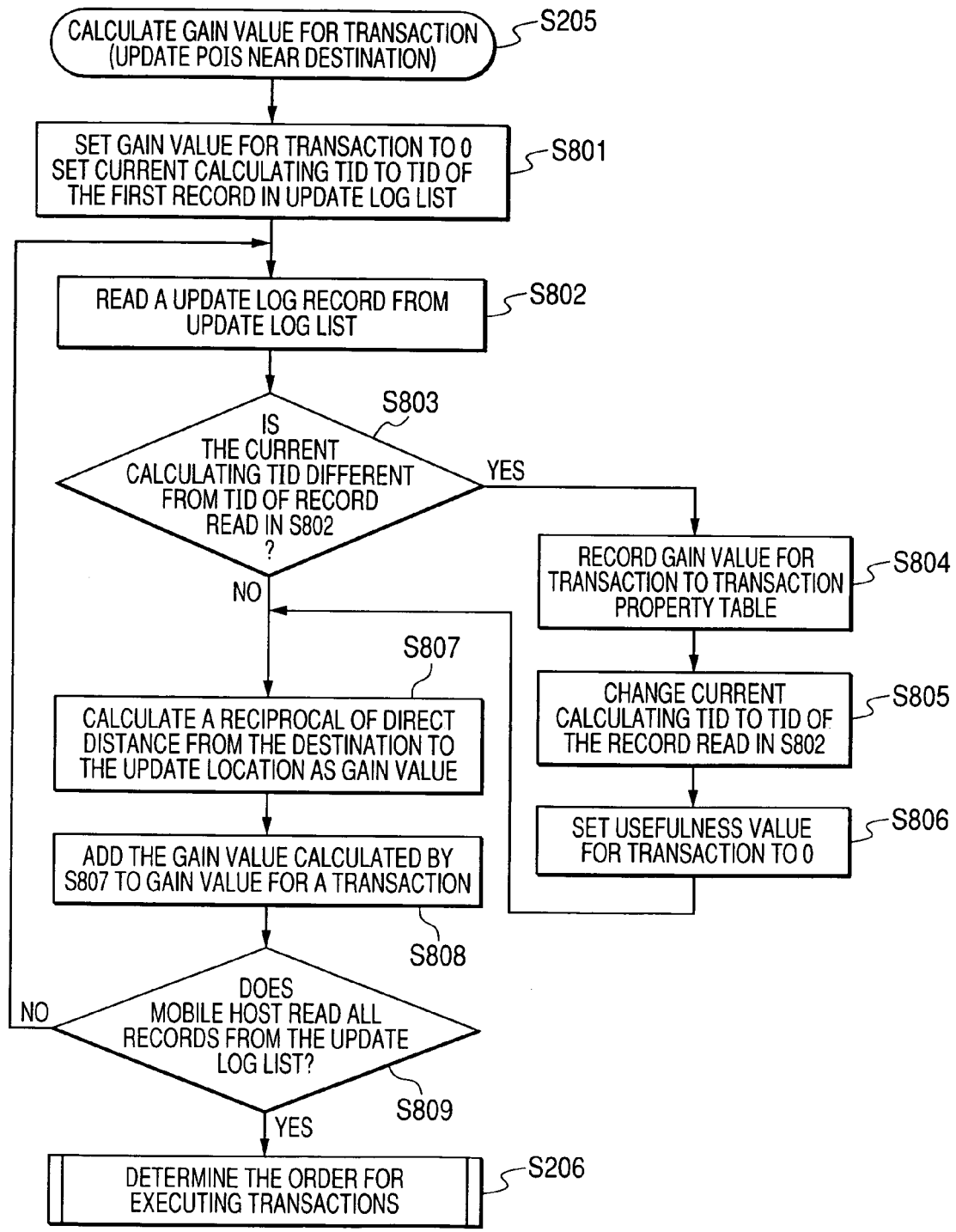
FIG. 11 is a flowchart of a procedure for calculating a transaction gain value when updating "around destination" is selected in the embodiment of the present invention.

FIG. 11 is a flowchart of a procedure for calculating a transaction gain value when updating "near destination" is selected in this embodiment of the present invention. In this processing, a gain value is calculated when each update log included in an object transaction is executed and the sum of the calculated gain values is assumed as a gain value of the subject transaction.

At first, the processor 21 of the mobile host 2 sets 0 for the gain value of an object transaction. The processor 21 then sets the ID of the calculation object transaction as the transaction ID of the first record in the update log list received from the service host 1.

The processor 21 then reads one update log from the update log list (S802) and decides whether or not there is a difference between the ID of the current calculation object transaction and that of the read record (S803).

If there is a difference (YES selected in S803), the processor 21 stores the calculated gain value of the transaction in the gain value field 2403 in the transaction property table. The processor 21 then changes the object transaction ID to that of the record read in the processing in S802 (S803) and sets 0 for the transaction gain value (S806).

After this, the processor 21 of the mobile host 2, if there is no difference (NO selected in S803) or if the processing in S806 is terminated, calculates a gain value for the updating of "near destination". Concretely, in this case, the nearer the POI item is to the destination, the larger the gain value becomes. And a reciprocal number of the distance in a straight line between the destination and the update point is assumed as a gain value.

The processor 21 then adds the gain value calculated in the processing in S807 to the transaction gain value (S808). And the processor 21 decides whether or not all the object records are read from the update log list (S809).

Upon completing reading of all the object records (YES selected in (S809), the processor 21 decides a transaction execution order (S206). If not completing the reading (NO selected in (S809), the processor 21 executes the processing in S802 to continue the calculation of the transaction gain value.

Figure 12:
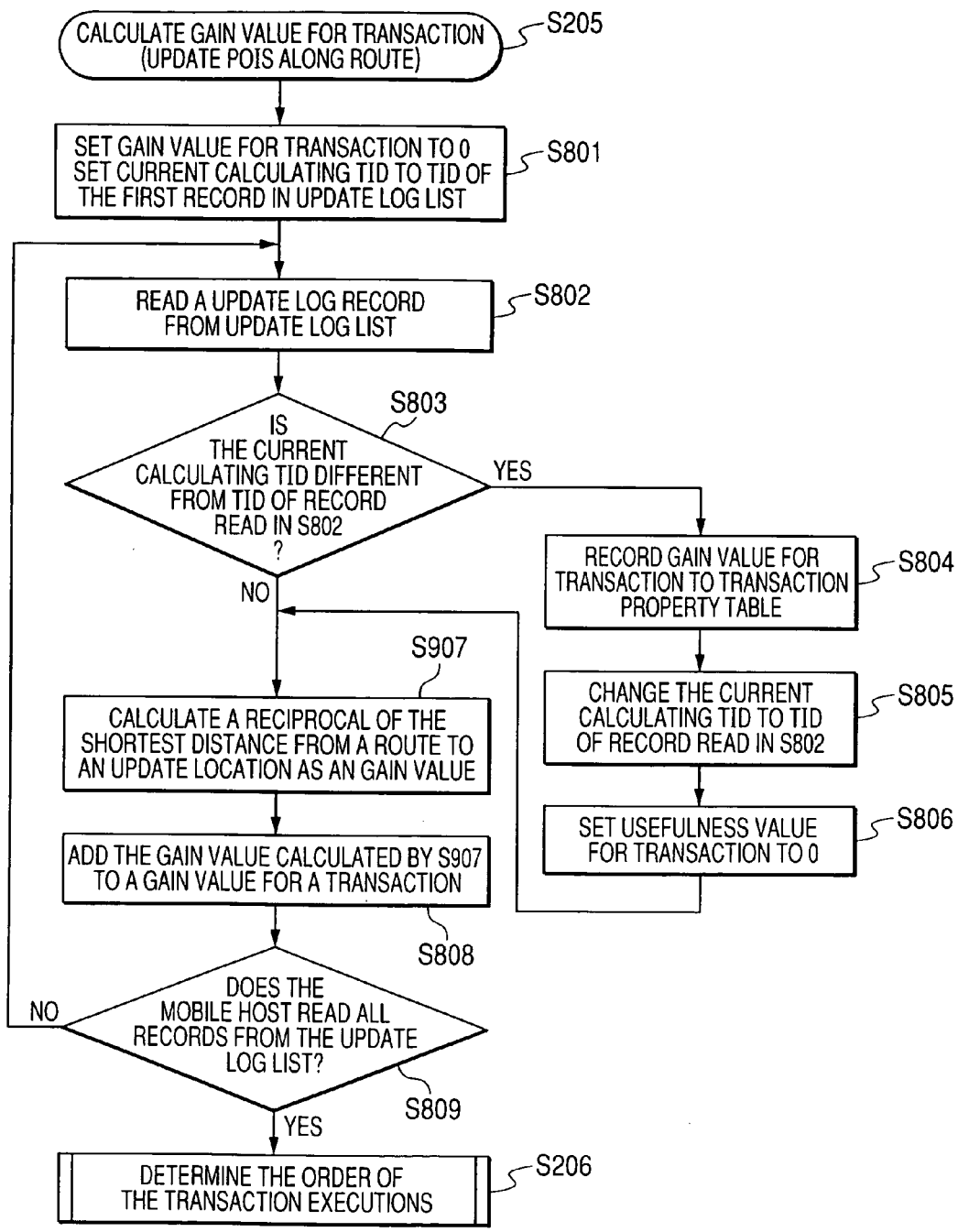
FIG. 12 is a flowchart of a procedure for calculating a transaction gain value when updating "along route" is selected in the embodiment of the present invention.

FIG. 12 is a flowchart of a procedure for calculating a transaction gain value when updating "along route" is selected in this embodiment of the present invention. This processing is almost the same as the processing for updating "near destination", but the transaction gain value calculation (S907) is different. Hereunder, this difference will be described.

When updating a POI item for "along route", it is assumed that the nearer the POI item is to the route, the larger the transaction gain value becomes. In this case, the route to the destination is assumed as the center between the entry point of the vehicle to a general road from a freeway and the destination. Concretely, the gain value is calculated so that a reciprocal number of the distance in a straight line between the route and the POI's location is assumed as a gain value.

Figure 13:
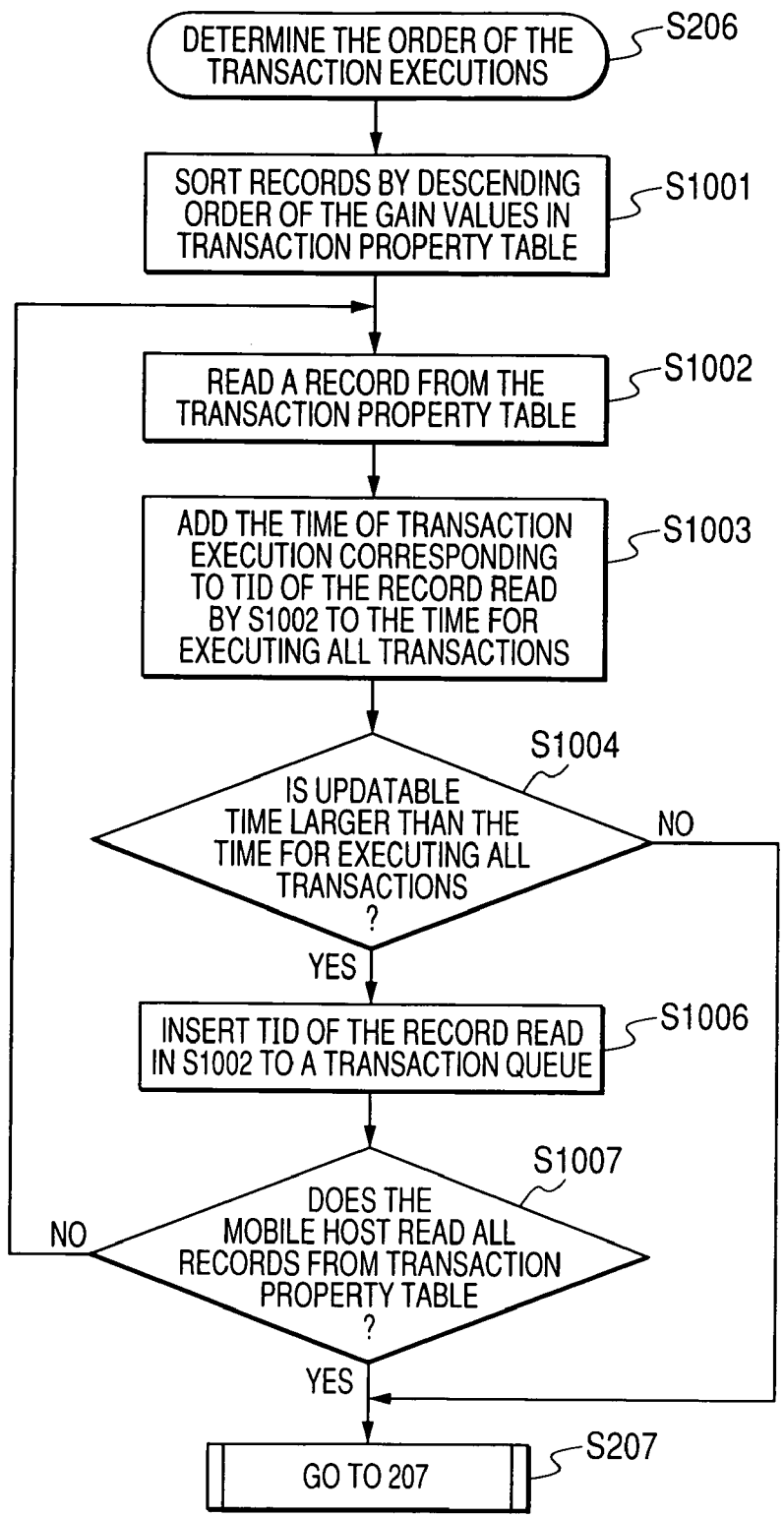
FIG. 13 is a flowchart of a procedure for deciding a transaction execution order in the embodiment of the present invention.

FIG. 13 is a flowchart of a procedure for deciding a transaction execution order in this embodiment of the present invention. In this processing, transaction IDs are inserted in an object transaction queue so that transactions are executed in a descending order of transaction gain values.

At first, the processor 21 of the mobile host 2 sorts the records in the transaction property table in a descending order of the gain values (S1001).

The processor 21 then reads one transaction property record (hereinafter, to be referred to simply as a record) from the transaction property table (S1002), then adds the transaction execution time to the total execution time of transactions (S1003). The transaction execution time is set to 0 upon starting a database updating, that is, when an estimation is started for the database update state.

The processor 21 of the mobile host 2 then decides whether or not the database updatable time is longer enough than the total execution time of transactions (S1004). If the time is longer enough (YES selected in S1004), the processor 21 inserts the transaction ID of the record in the transaction queue (S1006). The reason why such a longer updatable time is required is that the transaction execution might not be completed within the updatable time if the accuracy of the update time estimation is low.

If the updatable time is not longer enough (NO selected in S1004), the processor 21 exists this processing and executes the processing in S207 shown in FIG. 2.

The processor 21, upon completing the processing in S1006, decides whether or not all the object records are read from the update log list (S1007). If all the object records are read (YES selected in S1007), the processor 21 exits this processing and executes the processing in S207. On the other hand, if not completing yet (NO selected in S1007), the processor 21 executes the processing in S1002 to continue to decide a transaction execution order.

Figure 14:
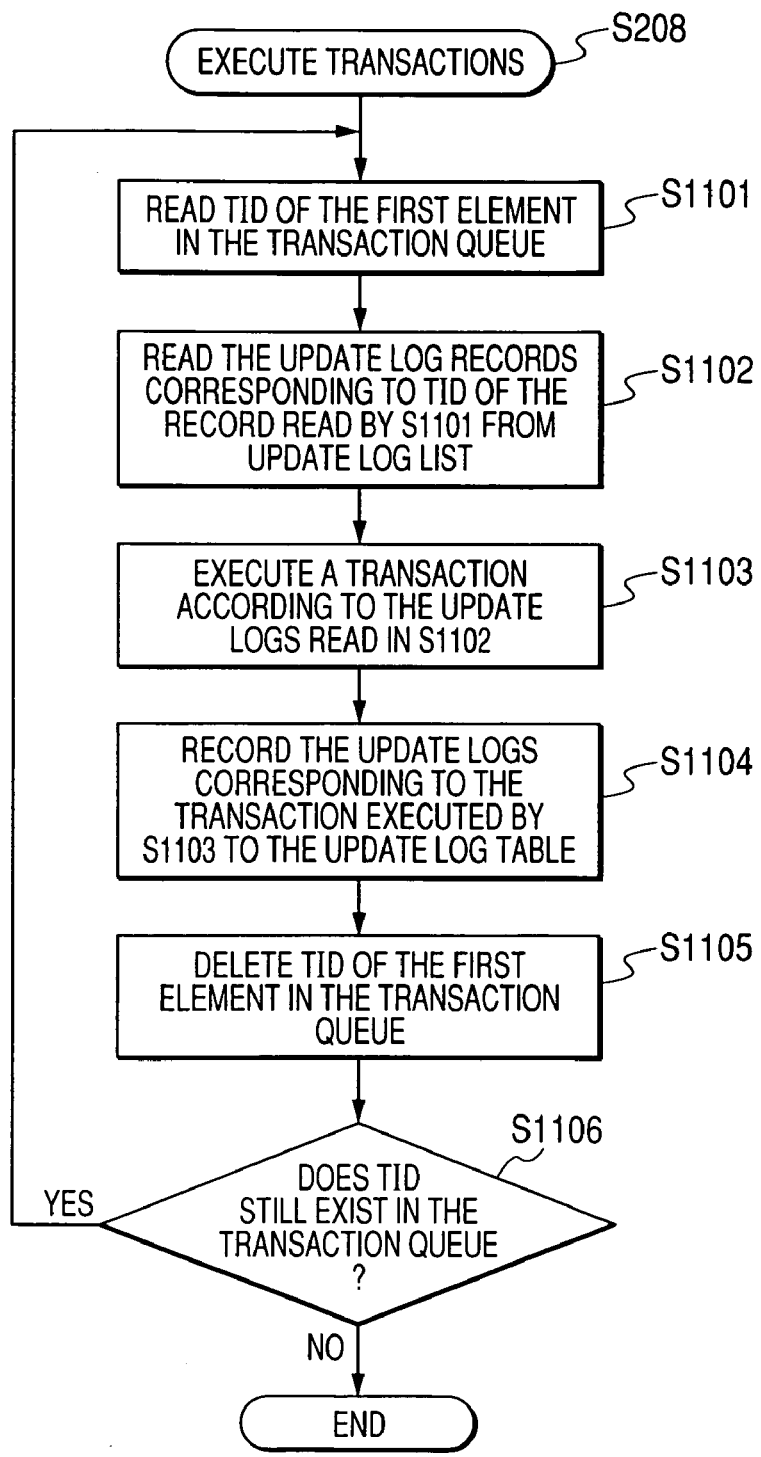
FIG. 14 is a flowchart of a concrete procedure for executing transactions in the embodiment of the present invention.

FIG. 14 is a flowchart of a concrete procedure for executing transactions in this embodiment of the present invention. In this processing, object transactions are executed in sequence of the transaction IDs inserted in the transaction queue.

At first, the processor 21 of the mobile host 2 refers to the ID of the first transaction in the transaction queue (S1101). The processor 21 then acquires an update log record corresponding to the transaction ID from the update log list (S1102).

The processor 21 then executes a database operation for the acquired update log record as one transaction (S1103). If there are a plurality of update log records included in one transaction, the processor 21 executes a plurality of database operations as one transaction.

The processor 21, upon completing the transaction processing, stores the executed update log data in the update log table (S1104) and deletes the ID of the first transaction from the transaction queue (S1105).

The processor 21 then decides whether or not there is any transaction ID in the transaction queue to execute the next transaction (S1106). If there is any transaction ID in the queue (YES selected in S1106), the processor 21 executes the processing in S1101, thereby continuing execution of transactions. On the other hand, if there is no transaction ID (NO selected in S1106), the processor 21 regards it as completion of all the necessary transaction processings and exits the transaction execution.

Figure 15:
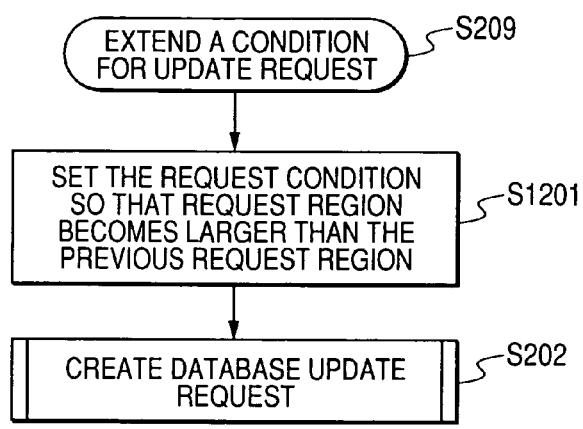
FIG. 15 is a flowchart of a detailed procedure for extending a database update request condition in the embodiment of the present invention.

FIG. 15 is a flowchart of a procedure for extending the condition of the database update request in this embodiment of the present invention.

This extension processing is executed to acquire additional update logs from the service host 1 as follows when the processor 21 of the mobile host 2 is still ready for more after completing all the object update logs included in the update log list received from the service host 1 within an updatable time.

At first, the processor 21 sets a request condition so as to expand the area of a region of which update is already requested to the service host 1 (S1201). Concretely, in the case of updating "near destination", the radius of the circular region around the destination is extended. In the case of updating "along route", the width of the region along the route is extended. By expanding the region area in which POI items are requested by the mobile host 2 from the service host 1 as described above, more POI items can be registered in the database 26 held by the mobile host 2. How to expand a requested region concretely will be described later with reference to FIGS. 16 and 17.

Figure 16:
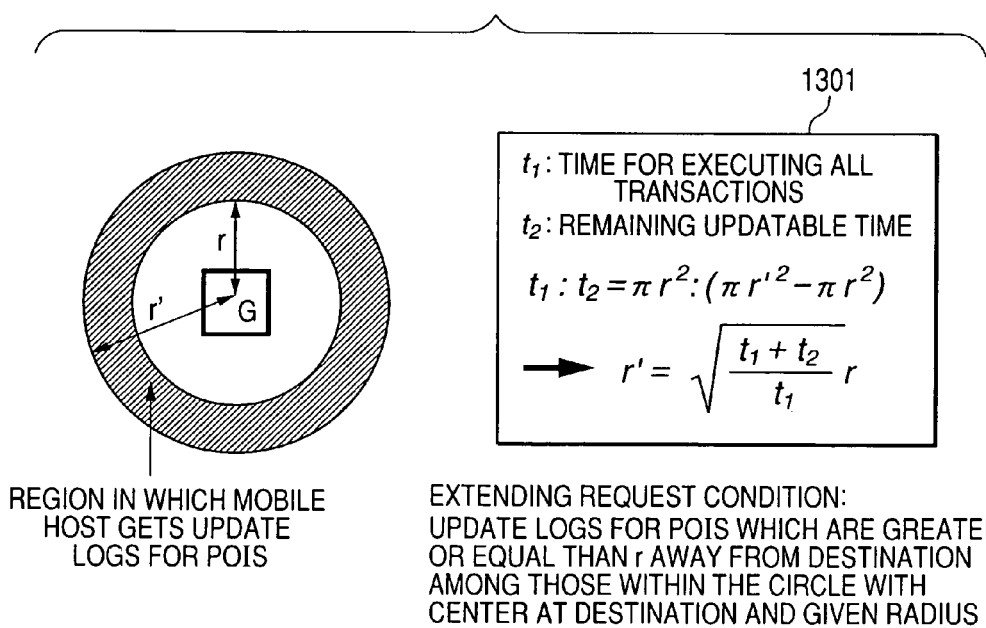
FIG. 16 is a diagram for describing the extension of a database update request condition when updating "around destination" is selected in the embodiment of the present invention.

FIG. 16 is a diagram for describing how the condition of a database update request is to be extended when updating "near destination" is selected in this embodiment of the present invention.

A white circular region having a radius of r around a destination G denotes an update region requested from the mobile host 2. A half-tone region excluding the preceedingly updated circular region having the radius of r from the circular region having a radius of r' around the destination G is the object region to be updated newly due to the extension of the update request condition.

The processor 21 of the mobile host 2 then requests update logs corresponding to the POI items included in the half-tone region to the service host 1. Here, if it is assumed that the transaction execution time is proportional to a region for which a transaction execution time is requested, the "r'" is represented by a formula 1301. In the formula 1301, t1 denotes a transaction execution time, t2 denotes a remaining database updatable time, and r denotes a radius of the previously requested region. And according to the formula 1301, a newly set update request is issued to an update log corresponding to the POI item included in a circle having a radius of r' around the destination G and included in a region away from the destination G by a distance of more than r.

Figure 17:
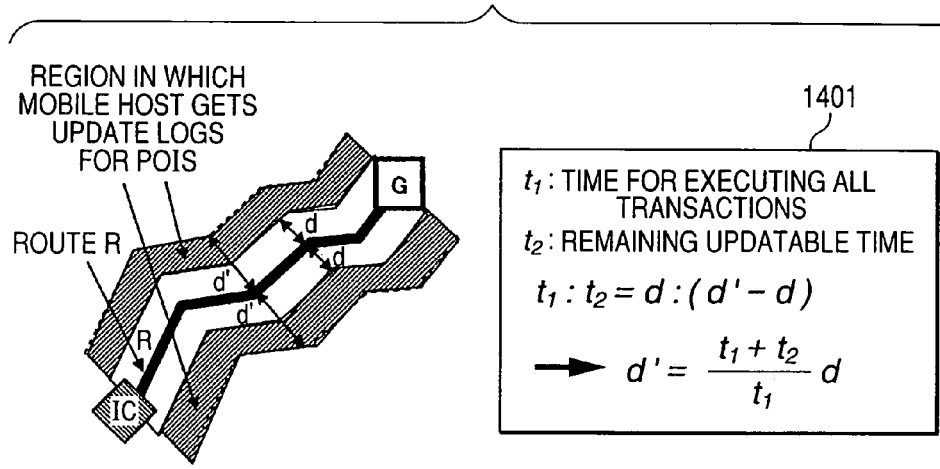
FIG. 17 is a diagram for describing the extension of the database update request condition when updating "along route" is selected in the embodiment of the present invention.

FIG. 17 is a diagram for describing how the condition of a database update request is to be extended when updating "along route" is selected in this embodiment of the present invention.

The region having a width d along a subject route R is an update region requested from the mobile host 2. The half-tone region except for the region having the width d from the region having a width d' along the subject route R is a region to be updated newly due to the extension of the update request condition.

The processor 21 of the mobile host 2 then requests update logs corresponding to the POI items included in the half-tone region to the service host 1. Here, if it is assumed that the transaction execution time is proportional to a region for which a transaction execution time is requested, the d' is represented by a formula 1401. In the formula 1401, t1 denotes a total transaction execution time, t2 denotes a remaining database updatable time, and d denotes a distance from the previously requested route R. According to the formula 1401, a newly set update request is issued to acquire an update log corresponding to the POI item included in a region having a width d' from the route R and having the shortest distance from the route R, which is d or over.

Hereunder, there will be described the data to be output to the output device 24 of the mobile host 2 when the mobile host 2 updates its own database in this embodiment of the present invention.

Figure 18:
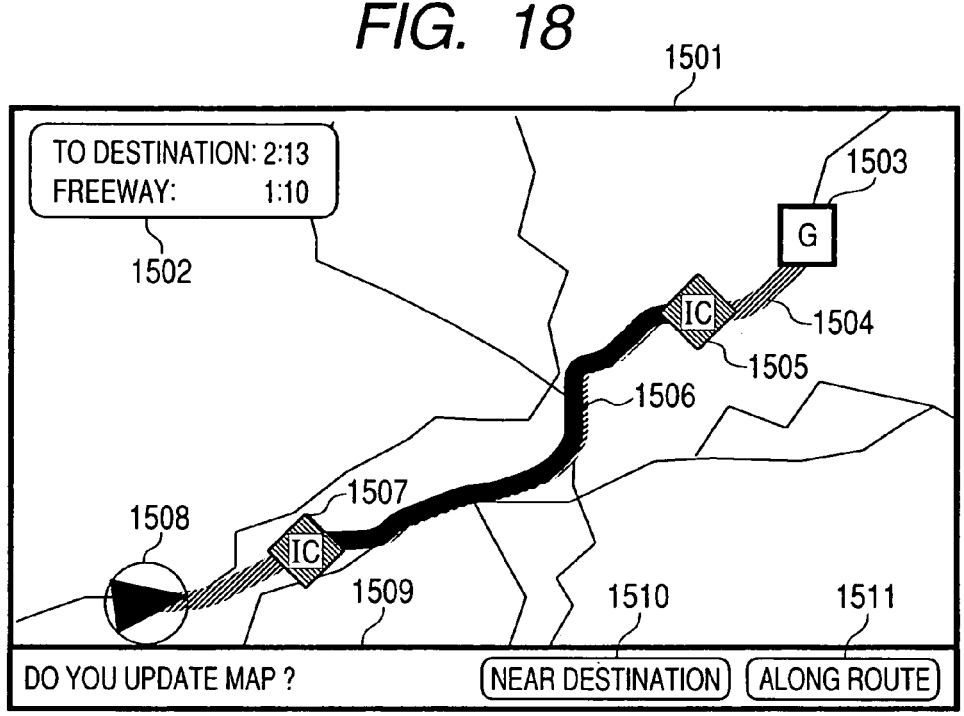
FIG. 18 is a screen of the mobile host after a route to the destination is searched in the embodiment of the present invention.

FIG. 18 shows a screen of the mobile host 2 to appear upon searching a route to a destination in this embodiment of the present invention.

At first, the user sets a destination in the mobile host 2. Then, the screen 1501 of the mobile host 2 displays a time required to reach the destination, a driving time 1502 on the freeway, and a route 1504 from the current position 1508 to the destination 1503.

In this embodiment of the present invention, the route to the destination includes a speedway. Thus the screen 1501 displays an interchange 1507 to the gate of the speedway and another interchange 1505 to the gateway of the speedway. And the speedway section 1506 is highlighted.

In the lower portion of the screen of the mobile host 2 is displayed a status bar 1509 for presenting information to the user. Upon searching a route to the destination, the status bar displays buttons for selecting update methods. The status bar, upon accepting a map update selection, displays a button 1510 for updating "near destination" and a button 1511 for updating "along route" to the destination from an interchange to the gateway of the speedway.

Figure 19:
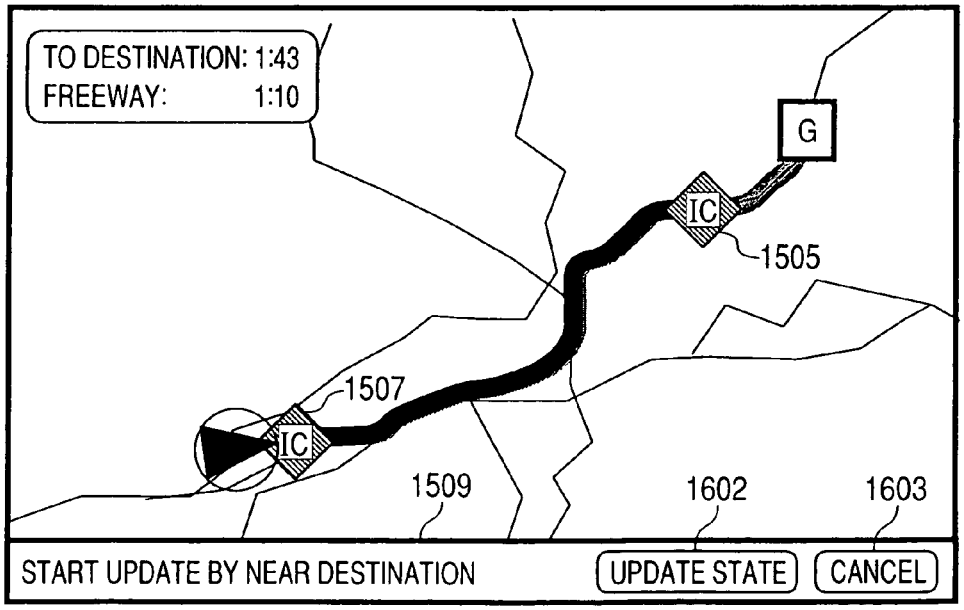
FIG. 19 is a screen of the mobile host to appear after the mobile host enters an interchange assumed as a gate to a speedway in the embodiment of the present invention.

FIG. 19 shows another screen of the mobile host 2 to be displayed after the mobile host 2 enters an interchange to the gate of a speedway.

In FIG. 19 is displayed a state assumed when the mobile host 2 enters the object speedway after the object route to the destination is searched and the user clicks the button 1510 on the status bar 1509.

When the mobile host 2 enters the speedway, the status bar 1509 displays a message to notify the user that the map data update is to be started.

When the user clicks the button 1602 for confirming the update state, the screen displays a region in which POI data is to be updated after a predetermined time. The screen displayed at this time will be described later with reference to FIGS. 23 and 24. And when the user clicks the button 1603 for canceling the update, the current update processing is canceled.

Figure 20:
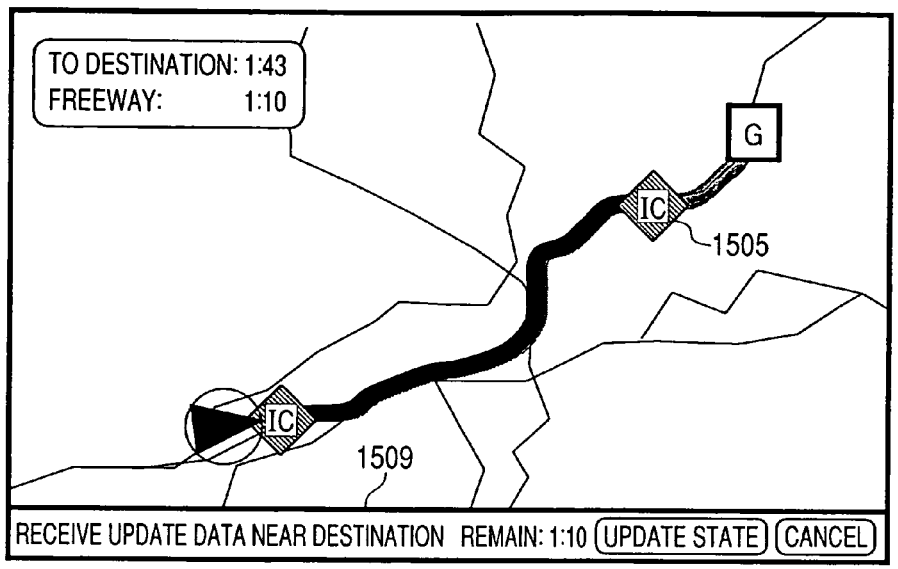
FIG. 20 is a screen of the mobile host to appear while mobile host receives an update log from the service host in the embodiment of the present invention.

FIG. 20 shows still another screen of the mobile host 2 to be displayed while the mobile host 2 receives an update log from the service host 1 in this embodiment of the present invention.

The status bar 1509, while the mobile host 2 receives updated data items, displays a message denoting that updated data items for "near destination" is received. The status bar 1509 also displays a time required to complete the subject update processing. The user can thus check the update state or cancel the update processing even while receiving the updated data items.

Figure 21:
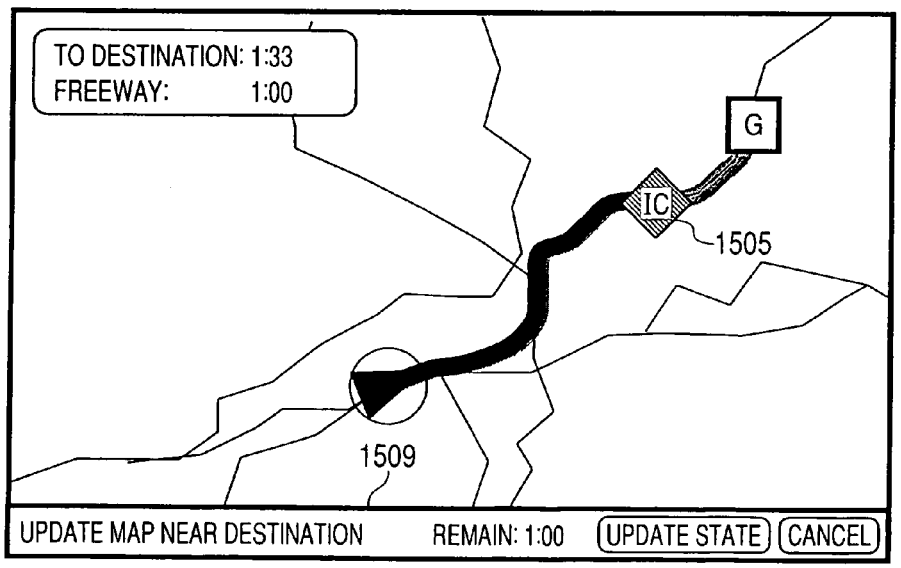
FIG. 21 is a screen of the mobile host to appear while the mobile host executes a transaction after receiving updated data items from the service host in the embodiment of the present invention.

FIG. 21 is still another screen of the mobile host 2 to be displayed while the mobile host 2 executes a transaction after completing receiving of the updated data items from the service host 1 in this embodiment of the present invention.

At this time, the status bar 1509 displays a message denoting that the POI items for "near destination" are updated in the database held by the mobile host 2.

Figure 22:
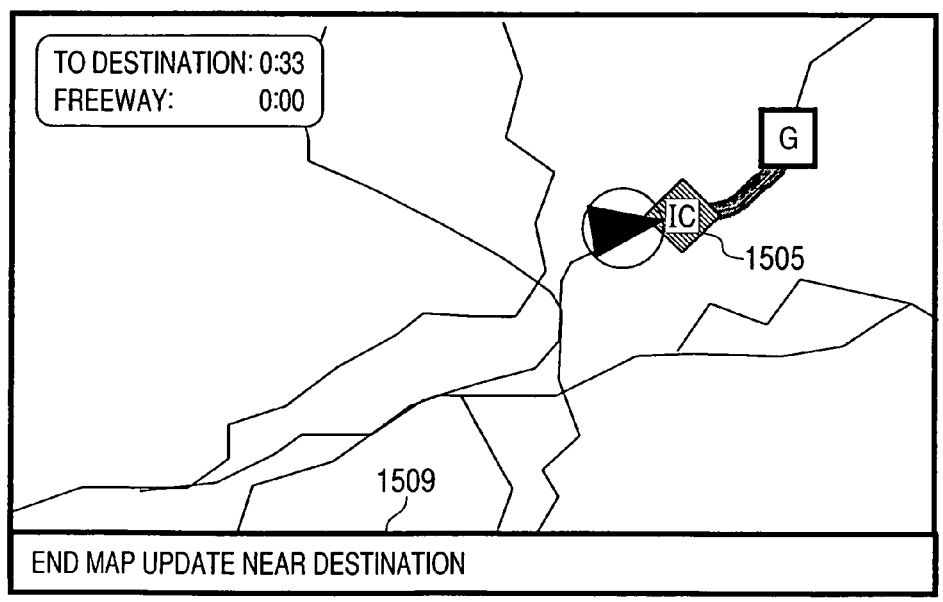
FIG. 22 is a screen of the mobile host to appear after mobile host completes the database update.

FIG. 22 shows still another screen of the mobile host 2 to be displayed after the database updating is completed in this embodiment of the present invention.

At this time, the status bar 1509 displays a message denoting that updating of the database held by the mobile host 2 is completed for the POI items for "near destination". FIG. 22 also shows a state in which the mobile host 2 has completed the database update for the region around the interchange 1505 to the gateway of the speedway.

Figure 23:
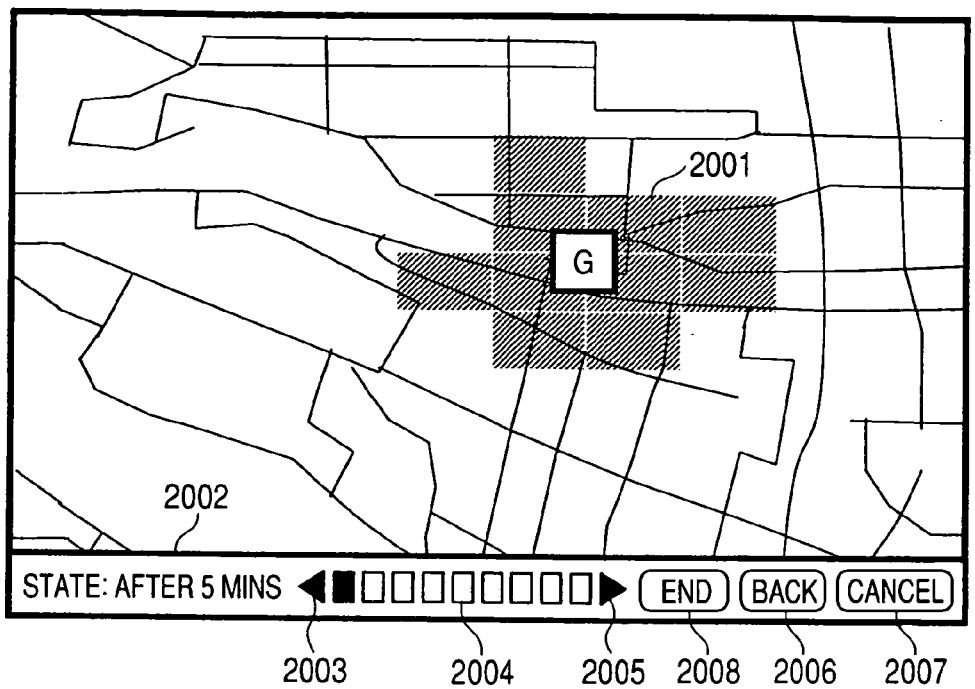
FIG. 23 is a screen of the mobile host to display a progress of the current database updating in the embodiment of the present invention.

FIG. 23 shows still another screen for displaying a progress of a subject database update in this embodiment of the present invention. FIG. 23 also shows the update state five minutes after the current time.

When the user clicks the update statue button 1602, the region 2001 in which POI items are to be updated is highlighted after a predetermined time from the current time. In this case, because the transaction execution order is decided before the mobile host 2 updates its own database, the region 2001 in which POI items are to be updated can be displayed based on the decided transaction execution order and the transaction execution information in the transaction property table.

At first, the user clicks the update state button 1602, then the status bar 2002 displays a message denoting an elapsing time from the current time. The status bar also displays buttons 2003 and 2005 used for adjusting the elapsing time and a gauge 2004 denoting an elapsing time. The user clicks the button 2003 to adjust the elapsing time backward. The user clicks the button 2005 to adjust the elapsing time forward. In this embodiment of the present invention, the scale of the gauge 2004 is divided in units of 5 min.

When adjusting the elapsing time from the current time, the user clicks the button 2003 or 2005. For example, if the user clicks the button 2003 to adjust the elapsing time backward while the update state after 10 min is displayed, the update state after 5 min is displayed. If the user clocks the button 2005 to adjust the time forward while the update state after 5 min is displayed, the update state after 10 min is displayed. The gauge 2004 displays an elapsing time from the set current time.

The status bar 2002 includes buttons 2008, 2006, and 2007. The button 2008 sets an end of an update processing. If the user clicks this button 2008, the current update processing is ended in the currently displayed update state. The user can thus specify an update region or time.

The user clicks the button 2006 to return to the previous screen for displaying a route to an object destination. The button 2007 cancels the current update processing.

Figure 24:
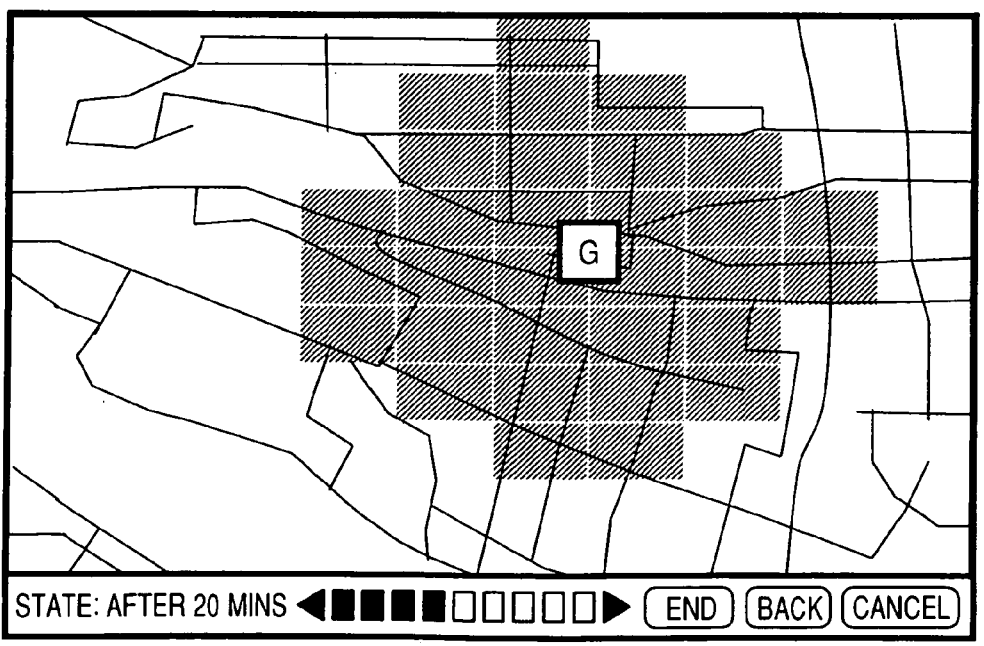
FIG. 24 is a screen of the mobile host to display a progress of the current database update in the embodiment of the present invention.

FIG. 24 shows still another screen for displaying a state of a database being currently updated in this embodiment of the present invention. The current update state shown in FIG. 24 is that to appear 20 minutes after the current time.

When compared with FIG. 23, the region in which POI items are to be updated is wider in FIG. 24. The user can click the button 2008 in FIG. 24 to cancel the update processing after 20 min and the database held by the mobile host 2 is kept updated until the state shown in FIG. 24.

According to this embodiment of the present invention, therefore, it is possible to process transactions as many as possible in a time band in which the usage frequency of the mobile host is low. As a result, the user's operation on the mobile host is less disturbed by update processings of the database.

Furthermore, according to this embodiment of the present invention, it is possible to process transactions including useful data for the user preferentially. Consequently, the user can acquire useful information from the database even when the user cancels the update processing of the database in a short time.

Furthermore, according to this embodiment of the present invention, it is possible to specify an object region to be updated by confirming its update state after a specified time. Consequently, the user can update his/her useful information in the minimal update time.

In this embodiment of the present invention, the mobile host is installed in the object vehicle. However, the present invention can also apply to any device such as a portable phone, PDA, etc.

What is claimed is:

1. A mobile host for receiving map data distributed from a host computer, the mobile host comprising:
   a database for storing map data distributed from said host computer; and
   a schedule manager for managing a schedule of said mobile host;
   wherein said mobile host, upon receiving an update request for the map data stored in said database, detects a timing at which usage frequency of said mobile host becomes low as an indication that a vehicle in which the mobile host is installed has entered a freeway driving state, and calculates a required time period for the vehicle to remain in the freeway driving state as a map data updatable time at which said usage frequency is kept low from said detected timing through said schedule manager;
   wherein said mobile host then sends an update request to said host computer according to said received update request;
   wherein said mobile host further calculates a necessary processing time for updating update object map data included within update information received from said host computer as a response to said update request and a usefulness value of said update object map data based on a distance between a route or a destination point from an update point;
   wherein said mobile host further decides a processing order for said update object map data according to said processing time and said usefulness value calculated respectively for said update object map data; and
   wherein said mobile host updates the map data stored in said database according to said decided processing order.

2. The mobile host according to claim 1; wherein update information received from said host computer is an update log recorded when map data stored in said host computer is updated;
   wherein said mobile host generates a transaction for updating said database according to said update log received from said host computer;
   wherein said mobile host then calculates an execution time for said generated transaction and a value denoting usefulness of map data to be updated by said generated transaction according to said processing time and said usefulness value calculated respectively for said update object map data; and
   wherein said mobile host decides a processing order for said update object map data according to said transaction execution time and said usefulness value calculated respectively for map data to be updated by said generated transaction.

3. The mobile host according to claim 1; wherein said mobile host sends another update request to said host computer if said update object map data stored in said database can be updated within said map data updatable time.

4. The mobile host according to claim 1; wherein said mobile host displays an update state of said object map data while map data stored in said database is updated;
   wherein said mobile host accepts an input of a time elapsed since updating of map data stored in said database is started; and
   wherein said mobile host displays a range of updating completed for said map data after said inputted time elapsed since updating of said map data stored in said database is started.

5. The mobile host according to claim 1; wherein said mobile host accepts an input of an update ending time with respect to map data stored in said database; and
   wherein said mobile host ends updating of map data stored in said database at said inputted update ending time.

6. A map data distribution system, comprising:
   a host computer for distributing map data; and
   a mobile host for receiving said map data;
   wherein said host computer includes a first database for storing said map data;
   wherein said mobile host includes a second database for storing the map data distributed from said host computer and a schedule manager for managing said mobile host;
   wherein said mobile host detects a timing at which its usage frequency becomes low as an indication that a vehicle in which the mobile host is installed has entered a freeway driving state through said schedule manager upon receiving an update request for the map data stored in said second database and calculates a required time period for the vehicle to remain in the freeway driving state as a map data updatable time at which a state of low usage frequency is continued, from said detected timing;
   wherein said mobile host sends an update request to said host computer in response to said received update request;
   wherein said host computer extracts update object map data from said first database in response to said sent update request and sends update information including said extracted object map data to said mobile host;
   wherein said mobile host calculates a necessary processing time for updating object map data included within the extracted object map data and a usefulness value of said object map data based on said update information and a distance between a route or a destination point from an update point;
   decides a processing order for said object map data according to said processing time and said usefulness value calculated respectively for said object data; and
   updates said object map data stored in said second database according to said decided processing order.

7. The map data distribution system according to claim 6; wherein said first database records an update log when map data stored in said first database is updated;

wherein said host computer, upon receiving an update request from said mobile host, sends said update log corresponding to updated map data to said mobile host as said update information;

wherein said mobile host generates a transaction for updating said second database according to said update log received from said host computer; calculates an execution time for said generated transaction and a usefulness value for map data to be updated by said generated transaction according to said processing time and said usefulness value calculated respectively for said object data; and decides a processing order for said object map data according to said transaction execution time and said usefulness value calculated respectively for map data to be updated by said generated transaction.

8. The map data distribution system according to claim 6; wherein said mobile host sends another update request to said host computer if said object map data stored in said second database can be updated within said updatable time.

9. The map data distribution system according to claim 6; wherein said mobile host displays an update state of said map data while map data stored in said second database is updated; accepts an input of a time elapsed since updating of map data stored in said second database is started; and displays a range of said updating completed after said inputted time.

10. The map data distribution system according to claim 6; wherein said mobile host accepts an input of update ending time for map data stored in said second database; and ends updating of map data stored in said second database at said inputted ending time.

* * * * *